US006448558B1

(12) United States Patent
Greene

(10) Patent No.: US 6,448,558 B1
(45) Date of Patent: Sep. 10, 2002

(54) ACTIVE INFRARED SIGNATURE DETECTION DEVICE

(75) Inventor: Michael L. Greene, Fort Washington, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/774,075

(22) Filed: Jan. 31, 2001

(51) Int. Cl.[7] ................................................. G01J 1/06
(52) U.S. Cl. ............... 250/353; 250/338.1; 250/339.14; 250/339.15; 250/340
(58) Field of Search ................... 250/338.1, 338.4, 250/339.14, 339.15, 340, 342, 353; 374/130, 131

(56) References Cited

U.S. PATENT DOCUMENTS

| 4,434,800 A | * 3/1984 | Anson et al. ............... 128/665 |
| 5,522,662 A | * 6/1996 | Shiokawa ................... 374/130 |
| 5,820,264 A | * 10/1998 | Tsao et al. .................. 374/131 |
| 5,886,664 A | * 3/1999 | Yujiri et al. ................. 342/351 |
| 6,133,552 A | * 10/2000 | Saulnier et al. ........... 219/446.1 |
| 6,179,466 B1 | * 1/2001 | Peuse et al. ................. 374/128 |
| 6,357,910 B1 | * 3/2002 | Chen et al. .................. 374/131 |

FOREIGN PATENT DOCUMENTS

WO    WO 82/00518    * 2/1982

* cited by examiner

Primary Examiner—Constantine Hannaher
Assistant Examiner—Tim Moran
(74) Attorney, Agent, or Firm—Mark Homer

(57) ABSTRACT

The present invention is a device for detecting modulated or active infrared light comprises a photodiode mounted on the base aperture of a wave guide for focusing infrared light onto the photodiode. The wave guide is preferably pyramid shaped and has a reflective surface on the inner surface. The apex of the wave guide comprises an acute angle from about 5 degrees to about 10 degrees. Units to process the signal and amplify the signal are attached thereto. The device may also include a Fresnel lens and a means to adjust the voltage of the active infrared signal processing means to improve detection capabilities.

19 Claims, 2 Drawing Sheets

ACTIVE INFRARED SIGNATURE DETECTION DEVICE

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

1. Field of the Invention

The present invention pertains to a device that enables persons to detect and defeat sensors in a particular reconnaissance area in order to enable entry into such areas. The device increases the detection capability of modulated infrared light or active infrared denial devices, such as the electronic trip wires.

2. Brief Description of the Prior Art

Presently, detection personnel employ a wand-like device to detect active infrared signatures prior to entering into certain reconnaissance areas to avoid detection. Active infrared signatures are detected by optoelectronic transducers, phototransistors, that are mounted on the wand, and the wand is then placed in the fringe of the path of active infrared beams. This device has several limitations. First, depending upon the area being surveyed, it could be extremely unsafe to place the wand in a position within the direct path of active infrared beams. Second, the range of the device is not sufficient to cover a large area. Present phototransistor type devices, such as the device described above or commercially available devices used in alarm systems, etc., normally can detect active infrared signatures from up to 20 feet to 40 feet depending upon the conditions under which the device is employed. Finally, in daylight use of the detector, present configurations provide no protection from interference from the sun. Due to these limitations, a more sensitive active infrared signature detector is required in many situations.

SUMMARY OF THE INVENTION

The present invention is a device for detecting active infrared that allows personnel to detect an infrared light signature, and, therefore, avoid such signatures when entering into areas containing them. The invention comprises a photodiode detector capable of detecting infrared light, usually within a range from about 780 to about 1300 nanometers. The photodiode detector is attached to the base of a wave guide, that helps guide the infrared light to the photodiode detector. This is accomplished by incorporating a reflective surface, such as a first surface mirror, on the inner surface of the wave guide so the infrared light reflects off of the inner surface with minimal loss due to absorption. One preferred shape of the wave guide is a pyramid. An adjustable signal processing means is attached to the photodiode detector to discriminate modulated infrared light within specific modulation frequency ranges for amplification. The amplified electronic signal will indicate that active infrared is present. The amplified signal can be sent to an LED for a visual indication or a speaker for an audio indication, when the amplified frequency is within the hearing range of the operator, that active infrared light is present.

A lens, such as a Fresnel lens, can be attached to the device near the receiving end of the wave guide in order to increase the sensitivity of the device. The sensitivity of the device can also be increased by incorporating a means of adjusting the discrimination of the electronic circuit to specific modulation frequencies by means of changing the supply voltage or a negative feedback network for the amplification means within the device.

The present invention can increase the sensitivity from the normal 20 to 40 foot range of present commercially available devices to a range of up to approximately 400 feet. This greatly reduces the danger to personnel entering areas that may contain active infrared.

Accordingly, it is an object of this invention to detect active infrared from a further distance than current active infrared detection devices.

It is a further object of this invention to reduce interference from the reflection of the sun during daytime active infrared detection.

It is still a further object of this invention to reduce the hazard of placing a detection device in the direct path of an active infrared beam.

This invention accomplishes these objectives and other needs related to detecting active infrared signatures.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The present invention is an active infrared detection device comprising a wave guide, having an inner surface that is reflective, that is capable of guiding an infrared light signature to a photodiode detector capable of detecting infrared light. The photodiode detector sends the infrared light signature to a processing means that amplifies the signature of the desired frequencies. This enables the active infrared signal to be displayed through audio and/or visual means indicating that active infrared is present. The sensitivity of the device can be increased by incorporating a lens at the receiving end of the wave guide. The sensitivity of the device can also be enhanced by incorporating a means for adjusting the voltage or feedback network of the active infrared signal processing means.

Figure 1:
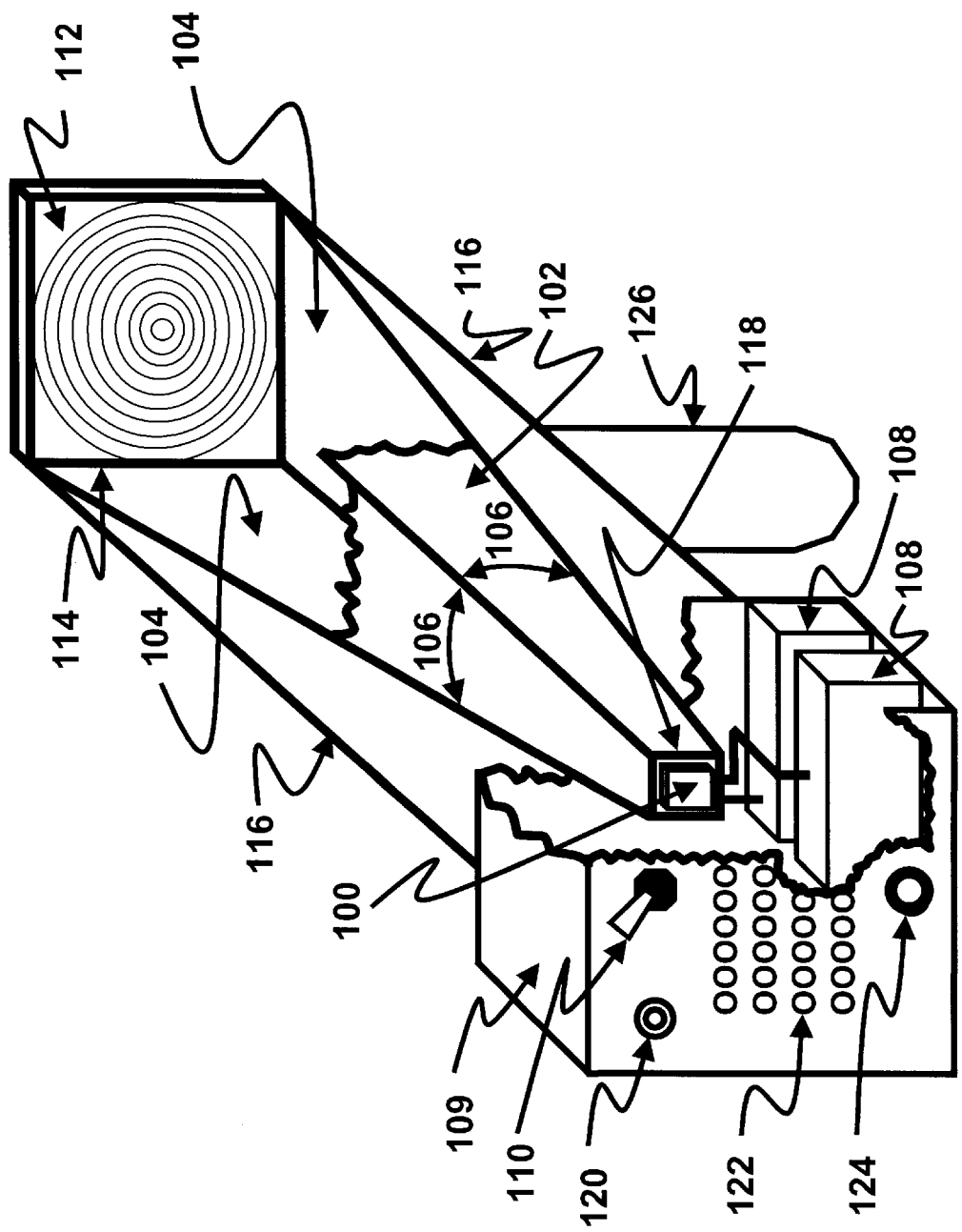
FIG. 1 is a partial cross-section of an embodiment of the invention.

Referring to FIG. 1, the present invention is an active infrared detection device comprising a photodiode 100 capable of detecting infrared light adjacent to a wave guide 102, having an inner surface 104 that is reflective, for focusing infrared light onto the photodiode 100. The wave guide 102 has an apex angle 106 comprising an acute angle from about 5 degrees to about 10 degrees. Connected to the photo diode 100 are means for processing 108 the infrared light signal that select the desired frequencies from the signal and amplify the signal in order allow visual or audio output to indicate the presence of the signal.

In order to make the device more sensitive, other embodiments of the invention can include a lens 112, approximately adjacent to the receipt aperture 114 of the wave guide 102. The lens 112 can focus the infrared light signature to increase the ability of the device to detect such signatures. The device can also include means that is not shown for adjusting the voltage and/or feedback network for the circuit for active infrared detection of specific frequencies for the active infrared signal processing means 108.

In a preferred embodiment, the photo diode 100 comprises a location substantially adjacent to the base aperture 118 of the wave guide 102. By placing the photodiode 100 in a position abutting the base aperture 118, losses of the signal "captured" and transmitted by the wave guide 102 can be minimized. The preferred detection range of the photodiode allows the photodiode to detect infrared light from about 780 nanometers to about 1300 nanometers. This range allows detection of infrared light from just over that detectable by the naked eye through the majority of the near infrared spectrum.

The wave guide 102 may be made of a myriad of materials selectable by one skilled in the art. The material selected should merely be rigid enough to hold its shape and withstand transport to and from locations of use. The preferred shape of the wave guide 102 is a four sided pyramid type shape having a receipt aperture 114 that allows the infrared light signature to enter the device and a base aperture 118 that allows the active infrared signature to exit the wave guide 102 and contact the photodiode 100. The preferred dimensions of the receipt aperture comprise an area from about 2 square inches to about 4 square inches. The preferred dimensions of the base aperture 118 comprise an area from about 0.1 square inches to about 0.2 square inches. In a preferred embodiment of the invention, the apex angle 106 created by the pyramidal shape of the wave guide 102 comprises an angle of about 8 degrees. These dimensions for the wave guide 102 provide sufficient "capture" of the infrared light signature, while also allowing the device to be easily transportable. The inner surface 104 of the wave guide 102 comprises a reflective surface in order to reflect the infrared light signature along the inside of the wave guide until the signature contacts the photodiode 100. The more reflective the inner surface 104, the less loss of infrared energy signature occurs within the wave guide 102, and, therefore, the more sensitive the device becomes. In a preferred embodiment of the invention, the inner surface 104 comprises a first surface mirror.

The infrared signal processing means 108 receives the infrared energy signature from the photodiode 100 and processes the signature so detection of the signal through audio or visual means becomes possible. In a preferred embodiment of the invention, the processing means 108 comprises a voltage sensitive amplifier to allow discrimination of modulated infrared light of certain modulated frequencies for amplification. In another preferred embodiment, the signal is sent from the processing means 108 to either an LED 120 for visual output, a speaker 122 or head-set jack 124 for audio output, or a combined visual and audio output.

In the embodiment shown in FIG. 1, the wave guide 102 is housed in case 116, where only the left and bottom sides are shown. The electronics of the apparatus herein described are housed in case 109 and contains an accessible on-off switch 110. This embodiment also comprises an ergonomically designed handle 126 for field use.

Figure 2:
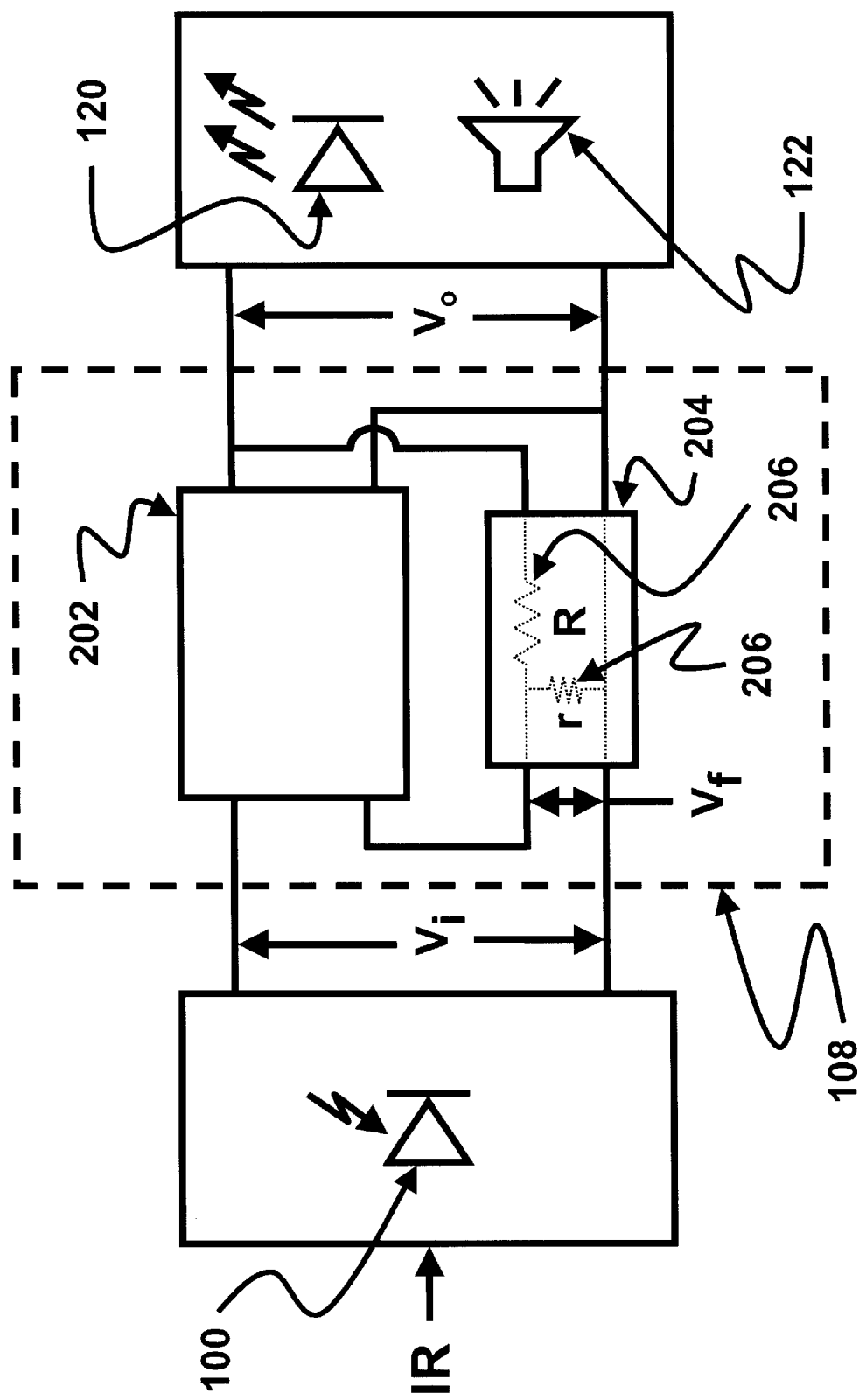
FIG. 2 is a circuit diagram of an embodiment of the active infrared processing means shown in FIG. 1.

Any method normally used to take an electronic signal and process the signal so that it can be displayed visually or audibly can be used as the infrared energy processing means 108 and can be selected by one skilled in the art. FIG. 2 sets forth a circuit diagrams of one embodiment of the infrared energy processing means 108.

Referring to FIG. 2, an electronic circuit for active infrared detection is shown that comprises an infrared light detector (photodiode 100), discriminating circuit (processing means 108), and display means (LED 120 and speaker 122). The circuit is comprised of photodiode 100 that is sensitive to infrared light and constitutes an infrared light detector. The amplification of the voltage output from a circuit containing photodiode 100 by amplifier 202 may be improved by negative feedback, part of the output from the amplifier 202 being fed back to the input of amplifier 202 through feedback network 204. Amplifier 202 gain without feedback is called open-loop gain; with feedback, closed-loop gain. By use of resistors 206, the feedback may be adjusted to produce a constant-gain system with a precise value of amplification. The output of the photodiode circuit, not shown, provides an input voltage $V_i$ to amplifier 202 and feedback network 204 with a feedback voltage $V_f = \beta V_o$ where $V_o$ is the output voltage and $\beta$ is the fraction of the output voltage fed back to the input. The fraction $\beta$ is equal $r/(R+r)$ and is shown in feedback network 204. The output voltage $V_o$ may be used to activate display means such as the LED 120 and/or the speaker 122 depicted.

The feedback network 204 may include capacitive elements, not shown, to achieve amplifier 202 response to required frequencies versus amplification of all frequencies. This feedback network 204 is designed to produce a feedback voltage with a frequency response equal to the inverse of the required amplifier 202 output. For one skilled in the art of frequency-response control by negative feedback, the amplifier 202 may be adjusted to various frequency ranges by means of switching and voltage control of the amplifier 202 and its feedback networks 204.

Referring again to FIG. 1, as noted above, in order to increase the sensitivity of the device, a lens 112 may be placed adjacent to the receipt aperture 114 in order to focus the incoming infrared signal. In a preferred embodiment of the invention, the lens 112 comprises a Fresnel lens having a focal length that is greater than the distance between the base aperture 118 and the receipt aperture 114 in order to optimize the receipt of the infrared signal to the photodiode 100.

The present invention also comprises a method of detecting active infrared light by using the device described above. The device would merely be turned on and pointed toward any area to detect an infrared light signature within said area. Any of the embodiments described above or within the following claims can be used in this method.

What is described are specific examples of many possible variations on the same invention and are not intended in a limiting sense. The claimed invention can be practiced using other variations not specifically described above.

What is claimed is:

1. An infrared light detection device, comprising:
   a photodiode;
   a wave guide having an inner surface comprising a reflective surface for focusing infrared light, the infrared light having a wavelength ranging from about 780 nanometers to about 1300 nanometers, onto the photodiode resulting in an infrared signal;
   wave guide walls, fan a base aperture and a receipt aperture, wherein the wave guide walls diverge so the receipt aperture comprises an area larger than an area of the base aperture;
   an apex, formed by extending the wave guide walls, comprising an acute angle from about 5 degrees to about 10 degrees; and,
   means for processing the infrared signal connected to the photodiode wherein the active infrared signal can be displayed visually or audibly.

2. The infrared light detection device of claim 1, wherein the reflective surface comprises a first surface mirror.

3. The active infrared detection device of claim 2, wherein the wave guide comprises a pyramid shape.

4. The infrared light detection device of claim 3, wherein the base aperture comprises an area of from about 0.1 square inches to about 0.2 square inches.

5. The infrared light detection device of claim 4, wherein the receipt aperture comprises an area from about 2 square inches to about 4 square inches.

6. The infrared light detection device of claim 5, wherein the photodiode comprises a location substantially adjacent to the base aperture.

7. The infrared light detection device of claim 6, wherein the apex comprises an angle of about 8 degrees.

8. The infrared light detection device of claim 7, wherein the infrared signal processing means comprises a voltage sensitive amplifier to discriminate frequencies of the infrared signal.

9. The infrared light detection device of claim 6, further comprising a Fresnel lens located approximately adjacent to the receipt aperture.

10. The infrared light detection device of claim 9, further comprising means for adjusting the voltage of the active infrared signal processing means.

11. The infrared light detection device of claim 2, further comprising a lens located between the receipt aperture and an incoming infrared wave.

12. The infrared light detection device of claim 11, wherein the lens comprises a location approximately adjacent to the receipt aperture.

13. The infrared light detection device of claim 12, wherein the lens comprises a Fresnel lens.

14. The infrared light detection device of claim 13, wherein the lens comprises a focal length greater than a distance between the base aperture and the receipt aperture.

15. The infrared light detection device of claim 14, further comprising means for visual and audio output connected to the infrared signal processing means.

16. The infrared light detection device of claim 15, wherein the visual and audio output means comprise an LED and a speaker.

17. The infrared light detection device of claim 1, further comprising means for adjusting the voltage of the infrared signal processing means.

18. A method of detecting infrared light having a wavelength from about 780 nanometers to about 1300 nanometers, comprising the steps of:

obtaining a device comprising a photodiode, a wave guide for focusing the infrared light onto the photo diode having an inner surface comprising a first surface mirror, wave guide walls, forming a base aperture and a receipt aperture, wherein the wave guide walls diverge so the receipt aperture comprises an area larger than an area of the base aperture, an apex formed by extending the wave guide walls comprising an acute angle from about 5 degrees to about 10 degrees, means for processing an infrared signal connected to the photodiode wherein the infrared signal can be displayed visually or audibly;

initiating the device; and, pointing the wave guide towards an area to detect any infrared light.

19. The method of claim 18, wherein the device further comprises a Fresnel lens located approximately adjacent to a receipt aperture.

* * * * *